March 15, 1966     A. F. JOHNSON     3,239,899
SEPARATING METALS FROM ALLOYS
Filed May 4, 1962     2 Sheets-Sheet 1
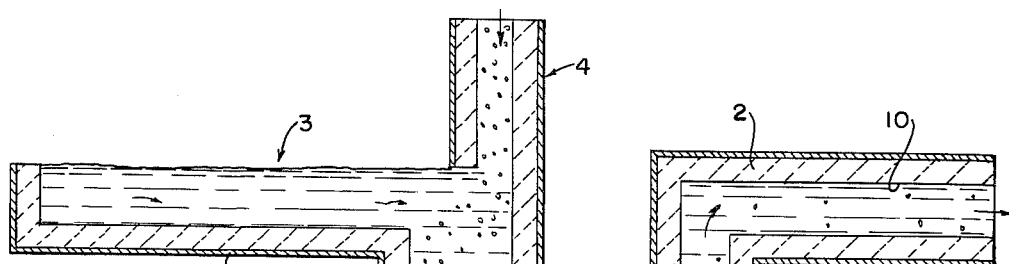
FIG. 1
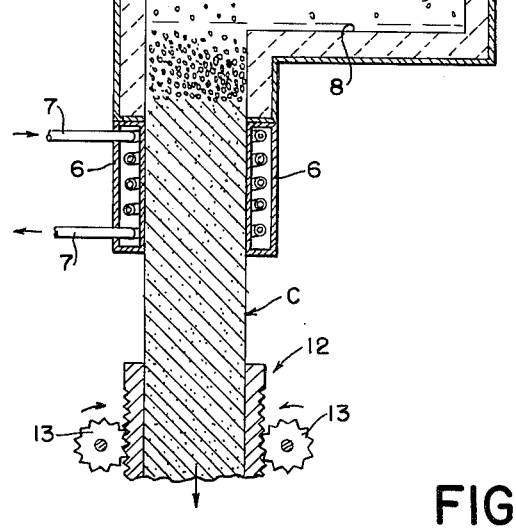
FIG. 2
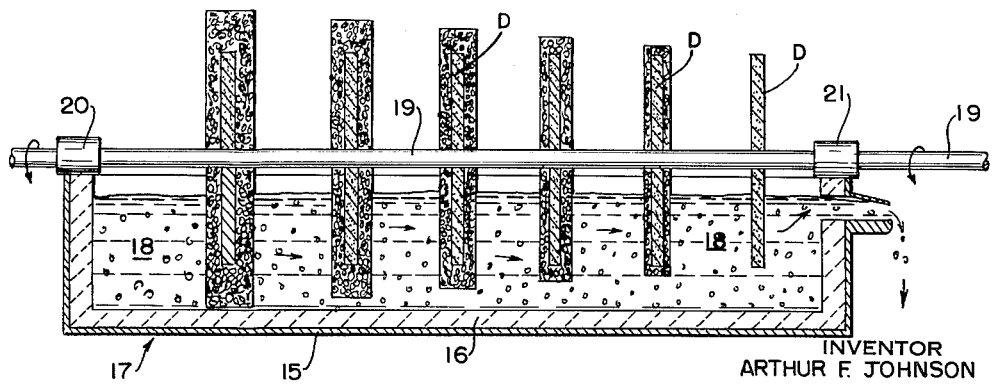
INVENTOR
ARTHUR F. JOHNSON
ATTORNEYS March 15, 1966  A. F. JOHNSON  3,239,899
SEPARATING METALS FROM ALLOYS
Filed May 4, 1962  2 Sheets-Sheet 2

INVENTOR
ARTHUR F. JOHNSON
BY Pennie, Edmonds,
Morton, Barrows & Taylor
ATTORNEYS United States Patent Office 3,239,899
Patented Mar. 15, 1966

3,239,899
SEPARATING METALS FROM ALLOYS
Arthur F. Johnson, 27th Floor, 235 E. 42nd St., New York, N.Y.
Filed May 4, 1962, Ser. No. 192,401
9 Claims. (Cl. 22—215)

This invention relates to the separation of commercially pure metals from their alloys and has for its object the provision of an improved process for separating from a molten alloy of the metal crystallized commercially pure metal. For convenience in illustrating the invention the process will be described with reference to the separation of commercially pure aluminum from an alloy of aluminum.

In modern commerce there are large quantities of scrap metals accumulated which consist of a variety of alloys. To obtain maximum utility in industry, it is necessary to separate such alloys into elemental metals, in as pure a form as possible, so that industry may compound new alloys presently in demand and with rigid specification of exact amounts of elemental metals.

This invention is based on my discovery of a practical process for seeding or contacting a molten alloy of aluminum with pure particles of aluminum, such as crystals or parts of crystals, at a temperature near the freezing point of pure aluminum and depositing pure aluminum on the particles. My invention may be practiced in one variation of the process by contacting the impure molten aluminum with solid crystals of pure aluminum on which pure aluminum is deposited. My method of purification is particularly applicable to removing pure aluminum from molten alloys containing fractional percentages of silicon, iron, magnesium, copper, manganese, zinc and gallium which are common impurities found in scrap aluminum and which lower the melting point of the alloy compared to pure aluminum.

An important feature of my invention is the type of grains of aluminum chosen as seed on which to freeze out pure aluminum. The grains I prefer are made of 99.99% or at least 99.80% purity melt of aluminum which is frozen by slowly cooling in a cast iron or refractory lined crucible while the melt is being constantly stirred by mechanically operated paddles. This results in the formation of particulate grains of aluminum suitable for my process. The peculiarity of these grains is that the nature of their manufacture related above results in cleavage along aluminum crystal faces to form each grain. A novel feature of my invention is that such crystal faces tend to build from the alloy melt in which they are immersed with a composition which more closely approaches their purity of composition than would the metal froze on particles without definite crystal faces exposed to the alloy melt.

The accompanying drawings illustrate embodiments of apparatus of my invention suitable for carrying out the process of the invention.

FIG. 1 is a sectional side elevation of one embodiment of apparatus;

FIG. 2 is a sectional side elevation of another embodiment of apparatus;

Figure 3:
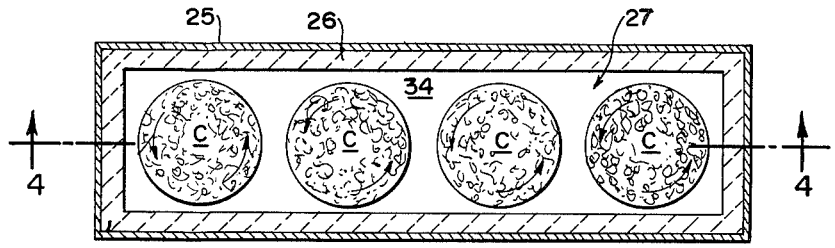
FIG. 3 is a plan view of another embodiment of apparatus of the invention.

The apparatus illustrated in FIG. 1 comprises a steel shell 1 lined with refractory 2 having at one side an alloy receiving chamber 3, an upright feed duct 4 directly over a depending and elongated chamber 5. Chamber 5 is preferably circular in cross-section and is continuous with the metal cooling collar 6 which is cooled by water circulated in the pipes 7. The chamber 5 has a lateral extension 8 leading to an upright channel 9 which connects with a lateral channel 10 on substantially the same level as the chamber 3.

A process of the invention is carried out in the apparatus of FIG. 1 as follows:

As regards the method used in contacting the pure aluminum metal crystals with the molten aluminum alloy to be purified, the molten alloy is poured into chamber 3 from which it flows into chamber 5. The molten alloy is filtered or percolated through a bed of the crystal grains of pure aluminum from feed duct 4 until the grains grow sufficiently that the interstices become filled and lower the filtration to an uneconomic rate. Alternatively, the crystal grains may be added to the alloy melt by mechanical mixing or stirring and the crystals built up by their contact with the alloy removed by means of the difference in specific gravity of crystals and alloy—that is, by skimming off the crystal grains built up to a larger size in contact with the alloy if the crystals are lighter in specific gravity than the alloy or by settling the crystal grains in a sludge that may be removed by rakes or by continuous casting. In the case shown in FIG. 1 the pure aluminum in the form of crystal grains is added to the molten alloy in feed duct 4 and settles therein and into chamber 5 to form a compacted mass of crystal grains enlarged by their growth in the alloy and softened by the heat of the alloy so that the compacted mass squeezed free of the mother alloy may be withdrawn in the form of a continuous casting C. The casting is cooled by the cooling unit 6 and is pulled slowly out of the chamber 5 by the gripping device 12 which has power driven rollers 13 in contact with the casting. The remaining alloy depleted in aluminum but containing some elemental aluminum flows through ducts 8, 9 and 10 and is removed from the furnace.

The apparatus of FIG. 2 comprises a steel shell 15 having a refractory lining 16 providing a vessel 17 for the treatment therein of molten aluminum alloy 18. The horizontal shaft 19 is mounted in bearings 20 and 21 and is rotated slowly by means not shown. The shaft has mounted thereon a plurality of discs D consisting of at least in part crystals of pure aluminum. The discs are preferably formed by compressing granules or crystals of pure aluminum.

In this method of practicing my invention the discs may be made of grains of metal by pressure or by first heating them and pressing them or by impregnating a softer metal disc with a facing of the grains. Such discs made of or impregnated with grains of aluminum are mounted on the shaft 19 and the discs are rotated in the chamber or trough-like vessel 17 through which the alloy flows from the end at the left in the direction of the arrows. The starting disc may be thin but grows in thickness and diameter as it is periodically moved into new positions from right to left in FIG. 2 because the aluminum of the alloy freezes out on the disc as pure aluminum and thickens it. The discs may be cooled with an inert cool gas blown onto them or by water cooling provided in the shaft and connected to a hollow interior in the starting disc (not shown). When a disc has grown to the largest thickness and diameter desired, as shown by the disc at the extreme left end of FIG. 2, the disc is removed from the shaft.

Figure 4:
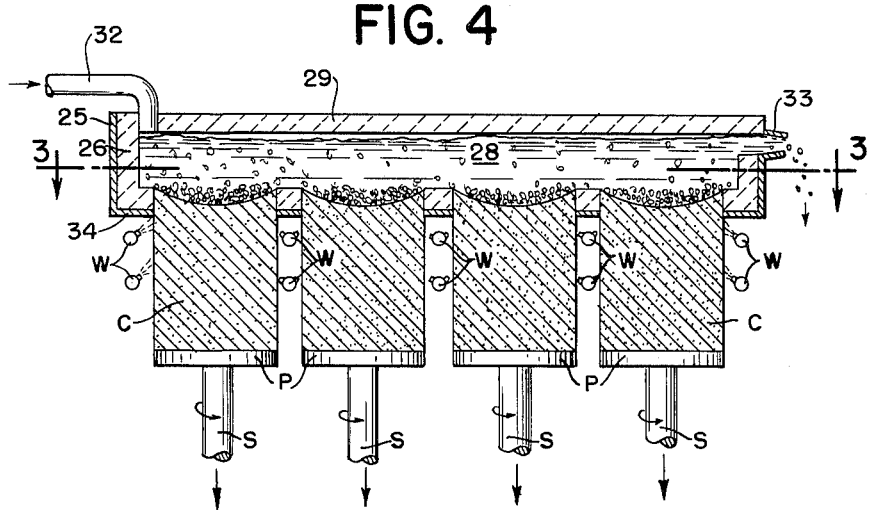
FIG. 4 is a sectional side elevation of 4—4 of FIG. 3.

The apparatus illustrated in FIGS. 3 and 4 comprises a steel shell 25 lined with refractory 26 forming an elongated trough or reservoir 27 for treating molten aluminum alloy 28 and a refractory cover 29. The cover has an opening near one end for a pipe 32 through which molten aluminum alloy is charged into the vessel 27. The opposite end of the vessel has an outlet spout 33 for removing alloy depleted in aluminum. The bottom 34 of the furnace has four circular openings in each of which is mounted a cylinder C of crystallized pure aluminum (herein also called a casting). Each of the aluminum cast cylinders is supported on a platform P which is attached to a shaft S which is a piston rod mounted in an hydraulic cylinder (not shown) for raising or lowering the platform and cylinder of aluminum. The shafts are also provided with means (not shown) for rotating the shafts and cylinders slowly. Any suitable mechanical means may be used to rotate the cylinders and to lower them at a controlled rate. Near the place where the aluminum cylinders emerge from the furnace bottom water sprays W are located to cool the aluminum casting.

In practicing a process of the invention in the apparatus of FIGS. 3 and 4 the aluminum alloy to be treated is flowed through pipe 32 into the reservoir 27 and the alloy depleted in aluminum flows out the opposite end through port 33. The previously cast starting cylinders C are inserted into the molten metal and are so located that the concave surfaces at their tops are at or near the reservoir floor or bottom 34. No leakage of molten metal downward occurs between the rotating castings and the refractory floor because the high viscosity of the molten alloy at the freezing point prevents its entrance into the thin clearance space between the rotating casting and refractory. The continuous casting devices are cooled with water sprays and lowered continuously as is well known in the art of continuous casting. In this variation of my invention I use a refractory trough above the continuous casting interface so that the molten alloy may be flowed horizontally over the continuous cast interfaces to the end that the aluminum of the alloy will be preferentially removed by crystallizing on the cylinders from the molten alloy flowing horizontally.

Instead of the reservoir shown in FIG. 3 the continuous castings may be formed in individual reservoirs formed not of refractory but of water cooled sheet as is common in the continuous casting of aluminum in conventional art. In this case I prefer to situate the casting devices stepwise, the second being at lower elevation than the first, and the third lower than the second and the fourth lower than the third so that alloys may be run in small troughs or preferably siphoned from the higher casting pool to the next lower casting pool. In any case I make the alloy metal inflow near one edge of each continuous casting and the outflow diametrically opposite. Although rotation of the castings is not necessary to preferentially freeze out pure aluminum on the cylindrical castings, I find that it is highly beneficial in the rapid and selective freezing out of a certain ingredient or eutectic mixture as the case may be.

The ideal speed of rotation, speed of casting or lowering, rate of removal of pure aluminum, amount of water cooling of the casting, such as temperature and volume of water sprays, temperature of the molten alloy and rate of flow of molten alloy over the casting cylinders are variables which should be established for each particular situation. In this modification of my process crystals of pure aluminum may be fed into the reservoir with the molten metal stream or in feeders (not shown in FIG. 3) directly above the castings so that the grains become embedded in the metal interfaces of the continuous cylindrical castings and insure that pure aluminum will have a preferential tendency to freeze on the interface and thus form the bulk of the continuous castings.

Figure 5:
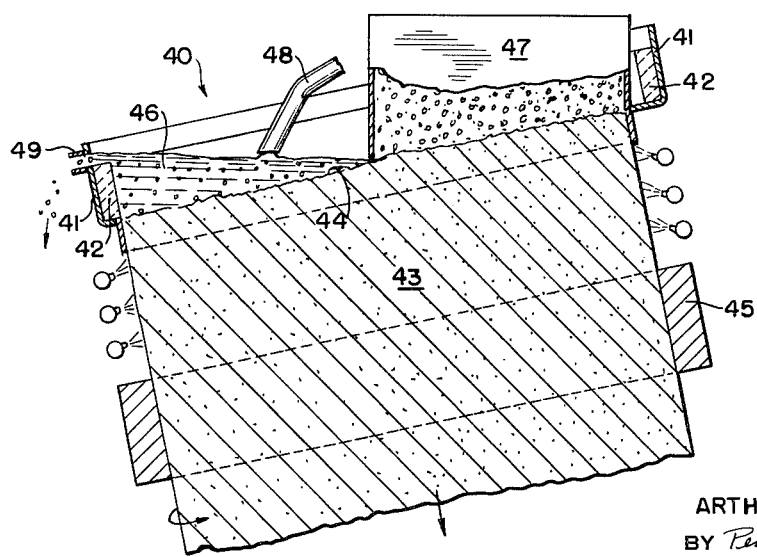
FIG. 5 is a side elevation of still another embodiment of apparatus.

The apparatus illustrated in FIG. 5 comprises an angularly disposed vessel 40 formed of an annular wall member 41 of steel having a refractory lining 42. The continuously cast aluminum cylinder 43 has its axis at an angle from the vertical and its top or interface surface 44 is in the plane of the vessel which is disposed a few degrees from the horizontal. The cylindrical casting is held in position by a supporting annulus 45 which is rotated by means not shown. The casting is moved downward at a controlled rate by apparatus of the type commonly used in moving continuous castings from molds. There is a close connection between the annular member 41 and the casting to prevent a loss of metal. Only about one-half of the interface 44 is in contact with the molten alloy 46 in the vessel 40. The exposed portion of the interface passes under a hopper 47 containing granules of pure aluminum to continuously spread a thin layer of the granules on the interface. A roller may be used to press these granules into the surface of the solid metal casting if desired.

In operating a process in the apparatus of FIG. 5 a molten alloy of aluminum is fed continuously into the vessel 40 through the pipe 48 at a rate such as to maintain a pool of metal over approximately one-half the area of the cylindrical casting 43. A major portion of the aluminum crystallizes on the interface 44. As the cylindrical casting 43 is rotated it increases in length due to its growth on top, and it is withdrawn below at the rate of growth. The molten alloy 46 in the vessel 40 becomes enriched in aluminum alloy and as this alloy accumulates it overflows through the spout 49.

In another method of practicing my invention molten aluminum of high purity excepting for contained small amounts of titanium, vanadium or molybdenum or like metals which tend to raise its melting point may be freed from these metals by contacting the melt of aluminum with crystal grains of the peritectic of aluminum and the respective metal contained as impurity in the melt. In this case the impurity is removed from the aluminum melt by freezing out the impurity as an alloy on the crystal grains containing the peritectic of the impurity. For example, an alloy of titanium would be frozen out on grains of peritectic of titanium, commonly supposed to be crystals of $TiAl_3$ and this alloy of titanium would contain more titanium than the melt and often several times as much.

I claim:

1. The process of continuously separating pure aluminum from an alloy of aluminum containing in solution at least one metal which lowers its freezing point which comprises mixing granular crystals of pure aluminum into the alloy bath, continuously passing the molten alloy of aluminum and the crystals of aluminum at a temperature near the freezing point of pure aluminum into contact with crystals of pure aluminum, continuously enlarging the crystals of pure aluminum and continuously withdrawing molten alloy depleted in aluminum from contact with the crystals.

2. In the process of claim 1, providing a casting of pure aluminum having a crystal face, maintaining the crystal face of the casting in contact with the molten aluminum alloy and crystals, rotating the casting and crystallizing out of the alloy pure aluminum on the crystals of the casting, and continuously removing the casting as it is lengthened by crystal growth.

3. The process of continuously separating pure aluminum from a flowing stream of molten alloy of aluminum containing in solution another metal which lowers its freezing point which comprises mixing into the molten alloy crystal grains of aluminum, freezing pure aluminum out of the alloy on the crystal grains which are thereby enlarged, and continuously separating the enlarged crystal grains from the molten alloy depleted in aluminum and continuously withdrawing molten alloy which is partially depleted in aluminum.

4. The process of claim 3 wherein the crystal grains of aluminum for the process are obtained by cooling a very pure melt of aluminum while at the same time mechanically stirring the melt so as to break the crystals into discrete grains while the metal is in the process of freezing.

5. The process of claim 4 in which the enlarged crystal grains of aluminum are separated from the molten aluminum alloy by adding the grains to a casting which is withdrawn from the molten alloy continuously.

6. The process of continuously separating pure aluminum from a stream of molten alloy of aluminum containing another metal in solution which comprises incorporating into the molten alloy stream granular crystals of pure aluminum, moving the alloy stream and crystals over a continuously-moving aluminum casting, continuously crystallizing aluminum and depositing the crystals on the casting, continuously removing the casting from the molten alloy stream as it enlarges due to crystals growth, and continuously withdrawing the stream of molten alloy which is partially depleted in aluminum.

7. The process of claim 6 in which the continuous casting is done on the sides of discs which dip into the molten alloy and are rotated on a substantially horizontal axis.

8. The process of claim 3 which comprises treating a plurality of cylinder castings having their top surfaces at different elevations in the molten aluminum alloy so that the molten alloy flows from one cylinder surface to another in succession while crystallizing aluminum on each cylinder.

9. The process of claim 6 which comprises rotating a cylindrical aluminum casting having its upper surface in molten aluminum alloy on which crystals of pure aluminum are deposited.

References Cited by the Examiner
UNITED STATES PATENTS

| | | | |
|---|---|---|---|
| 2,198,673 | 4/1940 | Loevenstein | 75—63 |
| 2,382,723 | 8/1945 | Kirsebom | 75—63 X |
| 2,471,899 | 5/1949 | Regner | 75—63 |
| 2,708,297 | 5/1955 | Zeigler | 22—57.2 |
| 2,747,971 | 5/1956 | Hein | 148—1.6 |
| 2,753,254 | 7/1956 | Rick | 75—63 X |
| 2,778,079 | 1/1957 | Carney et al. | 22—215 |
| 3,019,497 | 2/1962 | Horton et al. | 22—215 |
| 3,163,895 | 1/1965 | Dewey | 22—57.2 |

FOREIGN PATENTS

| | | |
|---|---|---|
| 212,725 | 3/1924 | Great Britain. |

OTHER REFERENCES

"Preparation of Metals Single Crystals" by Holden, A.N., Transactions of A.S.M., vol 42, 1950, pp. 319–328.

J. SPENCER OVERHOLSER, *Primary Examiner.*

MARCUS U. LYONS, ROBERT F. WHITE, WILLIAM J. STEPHENSON, *Examiners.*